March 21, 1933. J. R. WARNER 1,902,601
AUTOMATIC LUBRICATOR
Filed Aug. 8, 1929 5 Sheets-Sheet 1

Inventor:
Joseph R. Warner
By Chas. M. Nissen
Atty.

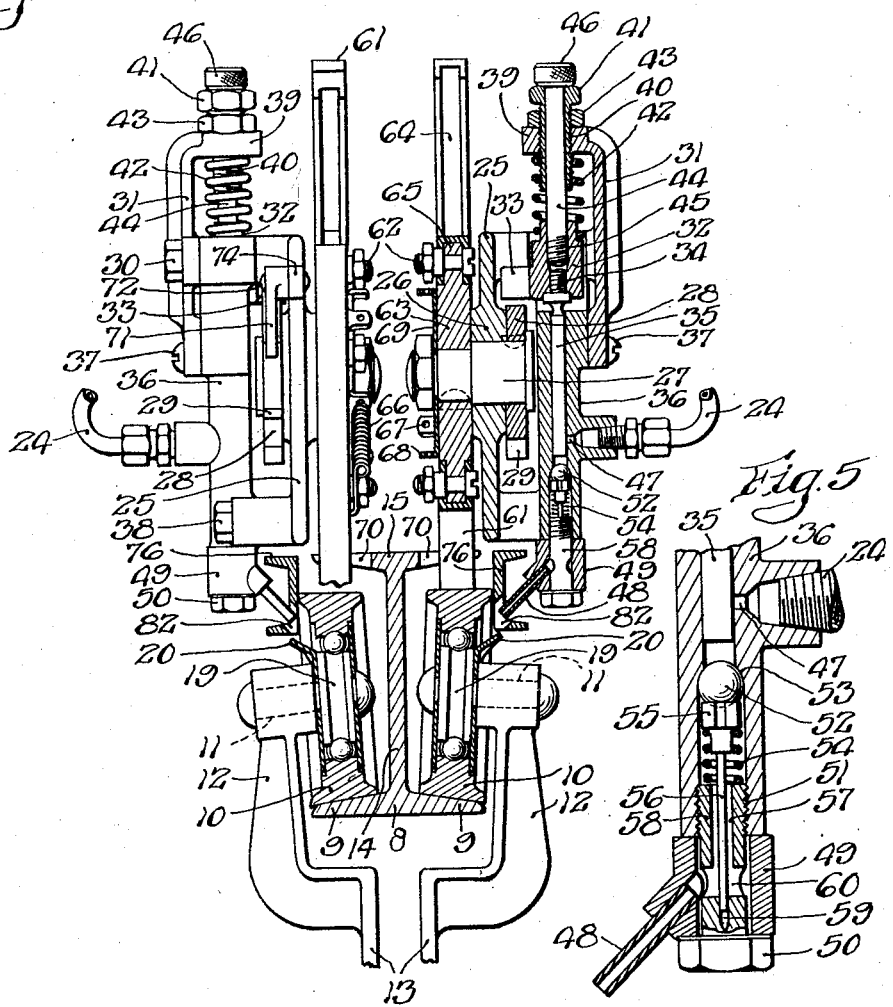

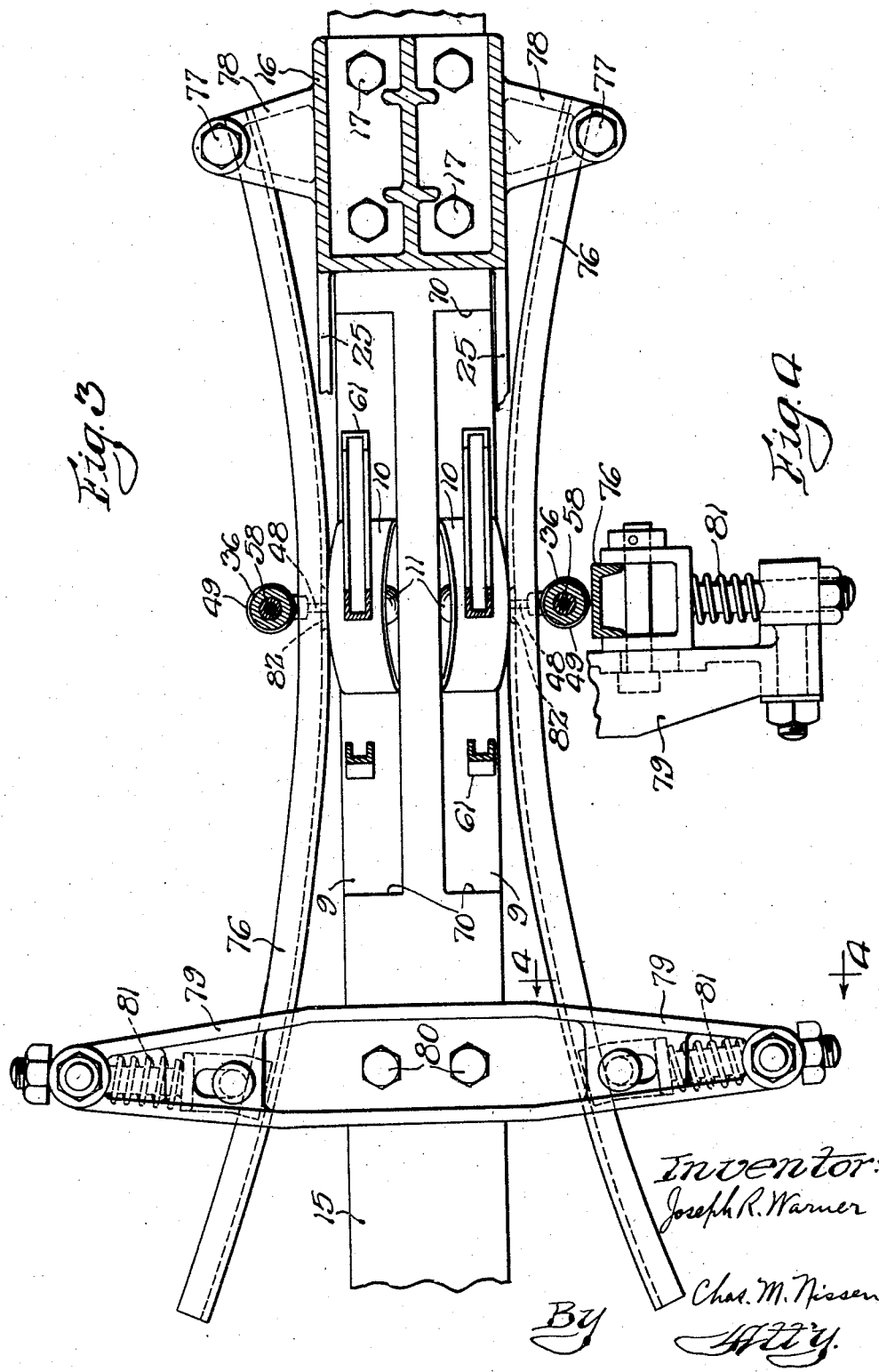

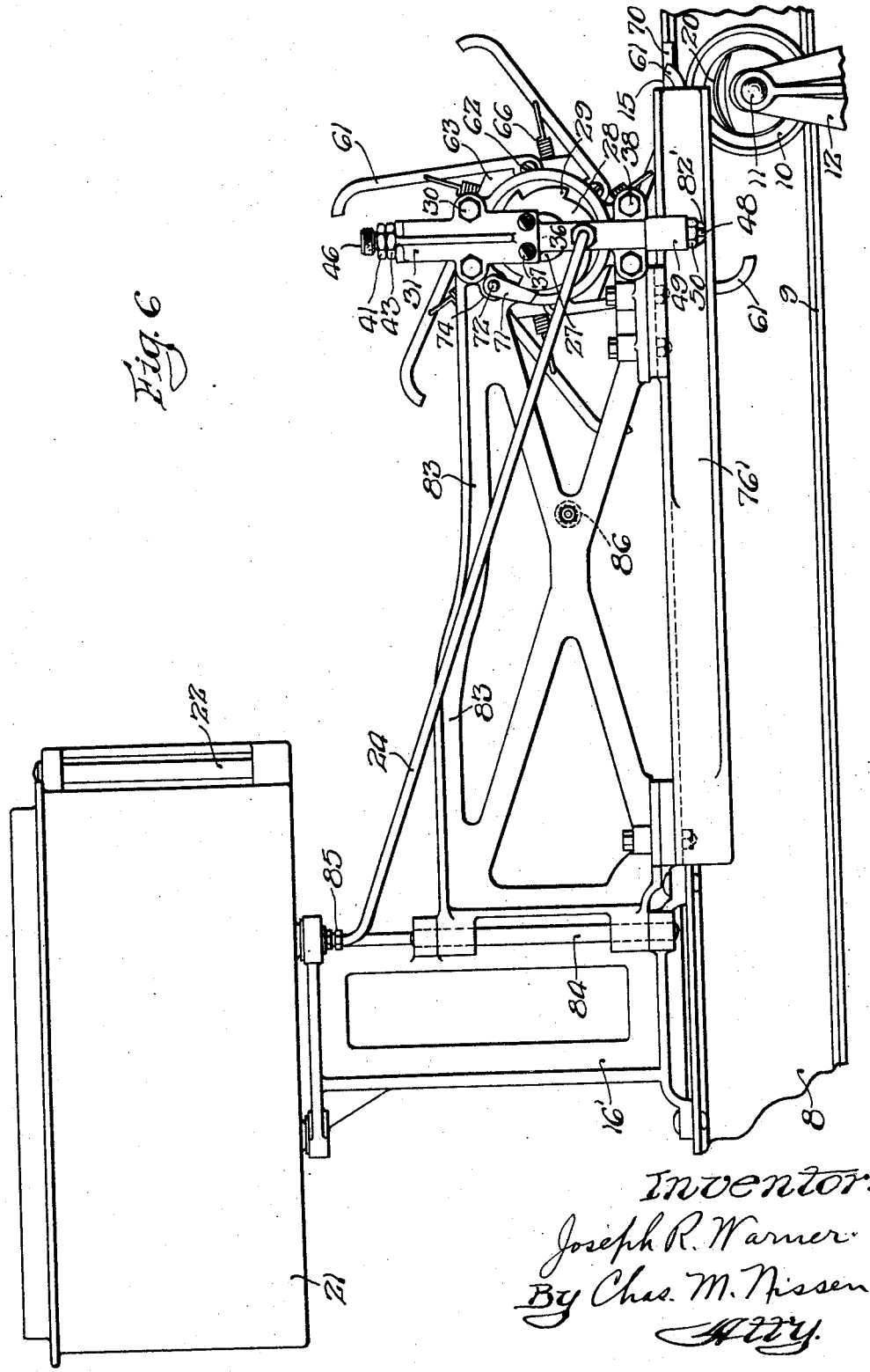

March 21, 1933.    J. R. WARNER    1,902,601
AUTOMATIC LUBRICATOR
Filed Aug. 8, 1929    5 Sheets-Sheet 5

Inventor:
Joseph R. Warner
By Chas. M. Nissen
Att'y.

Patented Mar. 21, 1933

1,902,601

UNITED STATES PATENT OFFICE

JOSEPH R. WARNER, OF FORT WAYNE, INDIANA, ASSIGNOR TO S. F. BOWSER & COMPANY, INC., OF FORT WAYNE, INDIANA, A CORPORATION OF INDIANA

AUTOMATIC LUBRICATOR

Application filed August 8, 1929. Serial No. 384,341.

The present invention relates in general to lubricators and is an improvement on the lubricator disclosed and claimed in my copending application, Serial No. 247,587, filed January 18, 1928, for an improvement in lubricators.

One of the objects of the present invention is the provision of improved and efficient apparatus for automatically effecting lubrication of a moving part of machinery at timed predetermined intervals.

Another object of the invention is the provision of a lubricator which is capable of delivering a lubricant at timed predetermined intervals for the purpose of lubricating certain parts of an apparatus or machine which are caused to move from one location to another during the operation of the machine or apparatus and permit such parts to be reversed in their movements without interference from the lubricating apparatus.

The lubricator is particularly adapted for use in connection with the lubrication of conveyor systems, although it may have a general application; in its preferred form the invention is particularly adapted to the automatic lubrication of bearings of trolley wheels of a conveyor chain, provision being made for permitting reversal of travel of the trolley wheels without being interfered with in such reverse travel by the lubricating apparatus.

Other objects of the invention will appear hereinafter, the novel features and combinations being set forth in the appended claims.

In the accompanying drawings—

Fig. 2 is a sectional elevation taken on the line 2—2 of Fig. 1, looking in the direction of the arrows;

Fig. 3 is a sectional plan view on the line 3—3 of Fig. 1;

Fig. 4 is a sectional elevational view of a portion of Fig. 3 taken on the line 4—4 and looking in the direction of the arrows;

Fig. 5 is an enlarged view in sectional elevation of the nozzle and the details of the mechanism associated therewith;

Fig. 6 is an elevational view of a modified form of lubricator also adaptable to conveyor systems.

Figure 1:
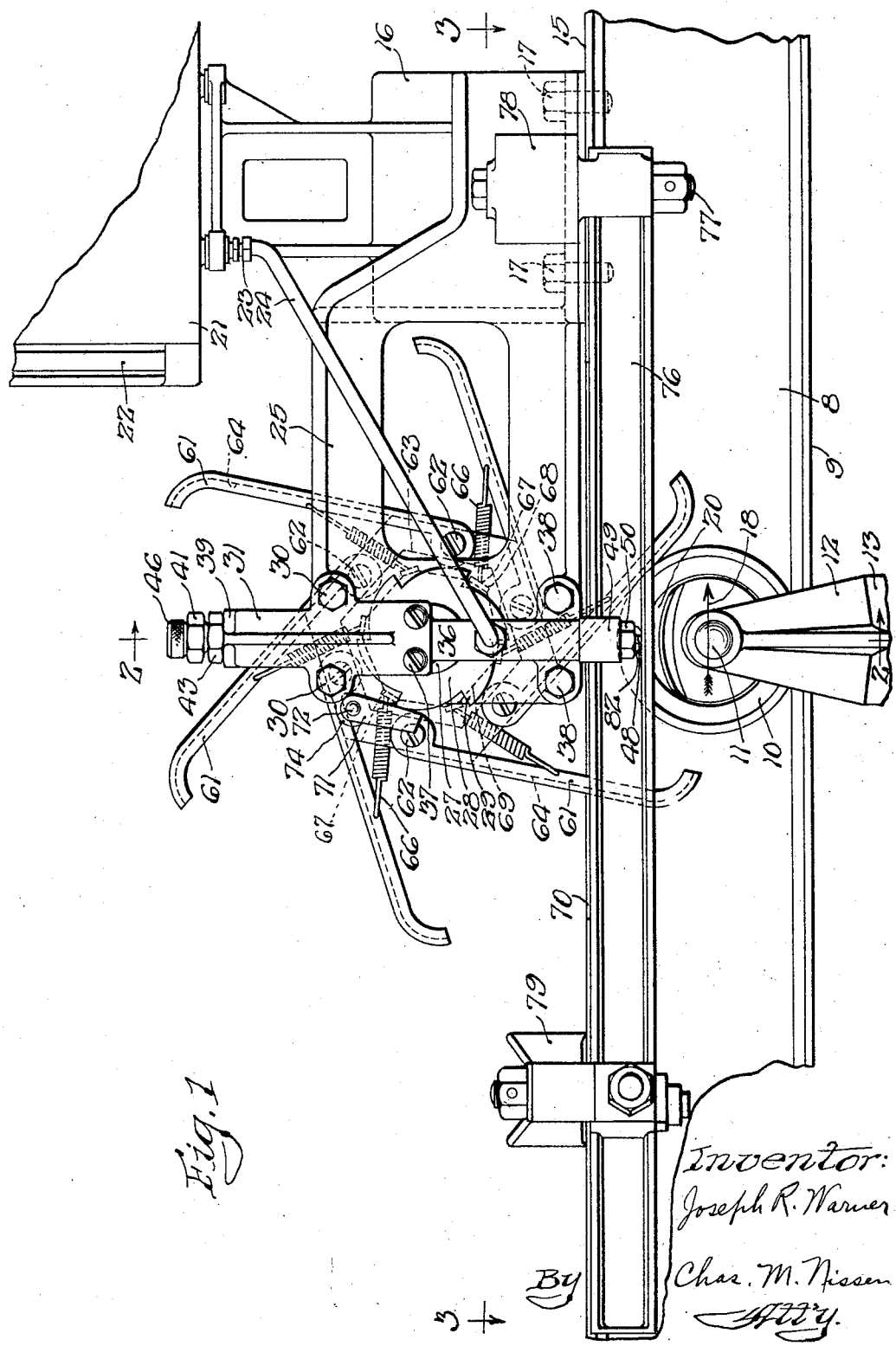
Fig. 1 is a side elevation of my improved lubricating apparatus adapted to a conveyor system.

In illustrating the application of my improvement to a conveyor system, I have shown only a portion of the conveyor system, but that portion represents those parts of the system which are to be lubricated by the automatic lubricator. A stationary I-beam 8 affords by reason of its lower laterally projecting flanges 9 parallel tracks for the trolley wheels 10, 10 mounted on rivets 11, 11 on the upper ends of the arms 12, 12 of the yoke 13 connected to the driving chain of the chain conveyor system. The I-beam 8 comprises a web 14 at the upper end of which is a horizontal flat head 15, the lateral flanges of which afford a suitable support for the frame 16 of the lubricating apparatus. As shown in Figs. 1 and 3, the frame 16 is bolted to the upper flat head 15 of the I-beam at 17, 17.

In the operation of the conveyor the trolley wheels 10 travel toward the right as indicated by the arrow 18 in Fig. 1. These trolley wheels are mounted to rotate on ball bearings 19, 19 as shown in Fig. 2 and oil cups for these ball bearings are provided at 20, 20. The purpose of the invention as adapted to the conveyor systems is to supply a lubricant to the roller bearing oil cups 20, 20 while the trolley wheels are traveling along the tracks 9, 9. The proper lubrication of these roller bearings requires positively timed lubrication and to accomplish this in an efficient and satisfactory manner, provision is made to automatically supply lubricant at timed predetermined intervals to such oil cups.

The lubricating apparatus comprises a lubricant reservoir 21 which may be provided with a suitable gauge 22 for indicating the level of the oil in the reservoir. The reservoir 21 is mounted in stationary and fixed position on the frame 16 which is bolted at 17, 17 to the top of the I-beam 8. Connected to the bottom of the reservoir 21 by means of a union 23 is a supply pipe 24 which extends downwardly at an angle as shown in Fig. 1.

As shown in Fig. 2, there are two lubricating devices each connected by means of the pipe 24 to the bottom of the supply reservoir 21. The lubricating devices are arranged on opposite sides of the I-beam 8 so as to supply lubricant to the roller bearings of the trolley wheels which travel along the tracks 9, 9 as shown in Fig. 2. Since these lubricating devices are alike in their structure and operation, a description of one of them is deemed sufficient. Secured rigidly to the frame 16 is a supplemental frame 25 which may be in the form of a plate extending toward the left as viewed in Fig. 1. In a bearing 26 at the rear end of the frame 25 is a shaft 27 to which is keyed a multiple cam 28. The individual wiping cams 29 are arranged as shown in Fig. 1 for operation in an anti-clockwise direction.

Secured to the frame 28 by means of the cap screws 30, 30 as shown in Fig. 1, is a guide frame 31. Adapted to reciprocate vertically in the guide frame 31 is a block 32 provided with a laterally extending pawl 33 in position to be engaged by the wipers 29.

By means of the screw-threaded connection 34 a reciprocating plunger 35 is secured to the bottom of the block 32. The plunger 35 extends into a cylinder 36, the upper end of which is secured by means of the screws 37 to the guide frame 31; the lower end of the cylinder 36 is secured to the frame 25 by means of the cap screws 38, 38 shown in Fig. 1.

The upper end of the guide frame 31 is provided with a bracket 39 which is screw-threaded to receive the screw-threaded sleeve 40, the upper end of which has a nut-head 41. A spring 42 is located between the bracket 39 and the reciprocating block 32 as shown in Fig. 2.

Adjustment of the quantity of lubricant is made by means of the screw-threaded sleeve 40. By turning the nut-head 41 it may be lifted or lowered and then locked in adjusted position by means of the lock nut 43. Extending through the sleeve 40 is a rod 44, the lower end of which is screw-threaded into the reciprocating block 32 as indicated at 45. The upper end of the rod 44 is provided with a knurled head 46. The spring 42 moves the block 32 downwardly as soon as the pawl 33 reaches the radial face of one of the wipers 29. The extent of downward movement of the plunger 35 will be determined by the position of the abutment head 41 on the sleeve 40. In other words, when the spring 42 moves the plunger 35 downwardly, such downward movement will be stopped by the knurled head 46 engaging the nut-head 41. Therefore adjustment of the relative positions of the heads 41 and 46 will regulate the extent to which the plunger 35 is moved downwardly.

The pipe 24 is connected to a port 47 in the side of the cylinder 36 intermediate its ends as shown in Fig. 2. When one of the wiper cams 29 lifts the pawl 33, the plunger 35 will have its lower end lifted above the port 47 and the oil will then flow into the cylinder 36 below the plunger 35.

Connected to the lower end of the cylinder 36 is a nozzle 48 mounted on the coupling 49 so as to extend downwardly at an angle as shown in Figs. 2 and 5. The coupling 49 together with the nozzle 48 are adjustable angularly on an upright axis and may be secured in adjusted position by means of the cap screw 50 which is screw-threaded at 51 into the lower end of the cylinder 36. The cap screw may therefore be used to clamp the nozzle 48 in the cylinder 36.

A ball check valve 52 is seated at 53 by means of the spring 54 and the spider 55. A stem 56 extends freely through an opening 57 in the shank 58 of the cap screw 50. The lower end of the stem 56 is guided in the recess 59. An annular passageway 60 in the screw shank 58 affords communication between the bore 57 and the nozzle 48. The upper end of the shank 58 affords a seat for the spring 54. It will thus be seen that when the plunger 35 is thrust downwardly past the port 47, the oil in the cylinder 36 below the plunger will be forced past the check valve 52 and to the nozzle 48 to force lubricant into the oil cup 20 of the roller bearing of the trolley wheel.

When the plunger 35 is released by the wiper cam, the spring 42 effects the downward movement of the plunger 35. Therefore the downward operation of the plunger 35 will force lubricant from the nozzle 48 which takes place very quickly so as to introduce lubricant into the oil cup 29 as it is traveling along the track 9. When a wiper 29 lifts the pawl 33, the block 32 will be lifted and the lower end of the plunger 35 will be moved above the port 47. As soon as the downward movement of the plunger 35 ceases the spring 54 will automatically close the check valve 52 and therefore while the plunger 35 is moving upwardly the check valve 52 will be closed and oil will be drawn by a suction due to the upward movement of the plunger 35, from the reservoir 21 through the pipe 24 into the cylinder 36. The distance between the check valve 52 and the outlet port of the nozzle 48 is comparatively small so that the oil will not drip from the nozzle, although no check valve is located therein.

In order to operate the lubricating devices at the proper timed intervals, each is provided with a plurality of wiping fingers 61, 61 pivotally connected at 62, 62 with the periphery of the hexagon 63 which is keyed to the shaft 27 as shown in Fig. 2. Each finger 61 is channeled on its inner face as shown at 64 in Fig. 2 to strengthen the same and the outer ends of these wiping fingers are curved as shown in Fig. 1. The periphery of the hexagon 63 is reduced in thickness as indicated 65 in Fig. 2 so as to fit the channels 64. The wiping fingers 61 being pivoted intermediate the ends of the straight faces at the periphery of the hexagon 63 will permit a portion of each straight face to enter the channel 64 and serve as an abutment to limit the movement of the wiping fingers 61 inwardly toward the shaft 27. Springs 66, 66 are connected to the fingers 61 intermediate their ends as shown in Fig. 1. The inner ends of these springs are connected at 67, 67 to bracket plates 68 extending from the hexagon plate 69 secured in adjusted position to the hexagon 63 as shown in Fig. 2.

The I-beam 8 has its upper flanges cut away as shown at 70, 70 in Figs. 2 and 3 to afford sufficient space for the wiping fingers 61 to rotate with the shaft 27 and be moved downwardly into the path of the traveling trolley wheels 10 as shown in Fig. 1.

The operation is such that when the trolley wheels 10 travel along the tracks 9, 9 they will engage the wiping fingers 61 which are in the path thereof. As shown in Fig. 1, when the trolley wheels are traveling in the direction of the arrow 18 one of the wiping fingers 61 will be engaged which will effect a counter-clockwise rotation of the hexagon 63. This will transmit movement to the shaft 27 to which is keyed the multiple cam 28. The wiper 29 which is on the upper side will then lift the pawl 33 and therefore lift the plunger 35 above the port 47 so that oil may flow from the pipe 24 into the cylinder 36. It should be understood, however, that the apparatus is so adjusted and timed that before the oil cup 20 reaches the nozzle 48 the wiper 29 will have cocked the plunger 35 and that just as the oil cup 20 reaches the nozzle 48 the wiper cam 29 acting in the nature of a trigger will release the pawl 33 and permit the spring 42 to exert a sudden impulse to shoot a stream of oil from the nozzle 48 into the cup 20 before it passes by the nozzle 48. As soon as this shot of oil has been produced into the oil cup 29 the check valve 52 will become effective to prevent drip from the nozzle 48.

It sometimes happens in the operation of chain conveyor systems that the chain recoils and causes the trolley wheels to back up. I have therefore provided the springs 66 connected as above described so that if the trolley wheels are reversed they may move along the tracks into engagement with such arms as may extend below the cutaway portions 70, 70. The springs 66 will permit this movement and the wiper fingers 61 will be moved on their pivots 62 without effecting any operation of the lubricating mechanism. The reversal of movement of the trolley wheels when necessary will therefore be permitted without injury to the lubricating apparatus and without interference therefrom.

If desired, a pawl 71 may be pivoted at 72 to a bracket 74 extending from the guide frame 31. This pawl 71 may co-operate with the multiple cam 28 so that the latter becomes a ratchet wheel to hold the cam against movement in a clockwise direction. Therefore when there happens to be a reversal of movement of the trolley wheels the lubricating apparatus will not be thrown out of adjustment and the pawl 71 co-operating with the multiple cam 28 acting as a ratchet wheel will compel the wiping fingers 61 to be moved on their pivots 62 against the action of the spring 66 and the shaft 27 will be prevented from being turned in a clockwise direction.

In order to guide the trolley wheels so that their oil cups 29 will be in registry with the nozzles 48, I have provided the guiding mechanism shown in Figs. 2, 3 and 4. Arcuate channels 76, 76 are pivoted at 77, 77 to brackets 78, 78 on opposite sides of the main frame 16. The arcuate channels 76, 76 extend along the upper sides of the I-beam and project through bracket arms 79, 79 bolted at 80 to the I-beam. Cushioning devices comprising the springs 81, 81 are mounted at the outer ends of the brackets arms 79, 79 in position to be engaged by the free end portions of the arcuate channels 76, 76. The springs 81, 81 will therefore continually urge the inner faces of the channels 76, 76 toward the upper peripheral lateral outside edge of each of the trolley wheels. Openings 82, 82 are provided in the channels 76, 76 as shown in Fig. 2 in the positions shown in Fig. 3. As the trolley wheels travel toward the right as viewed in Fig. 3, they will be guided by the diverging portions of the channels 76, 76 so that when the oil cups 20, 20 come opposite the nozzles 48, 48 the channels 76 will be in engagement with the outside peripheral edge of the trolleys with the assurance that the nozzles will be in registry with the oil cups 20, 20 as shown in Figs. 2 and 3.

Figure 7:
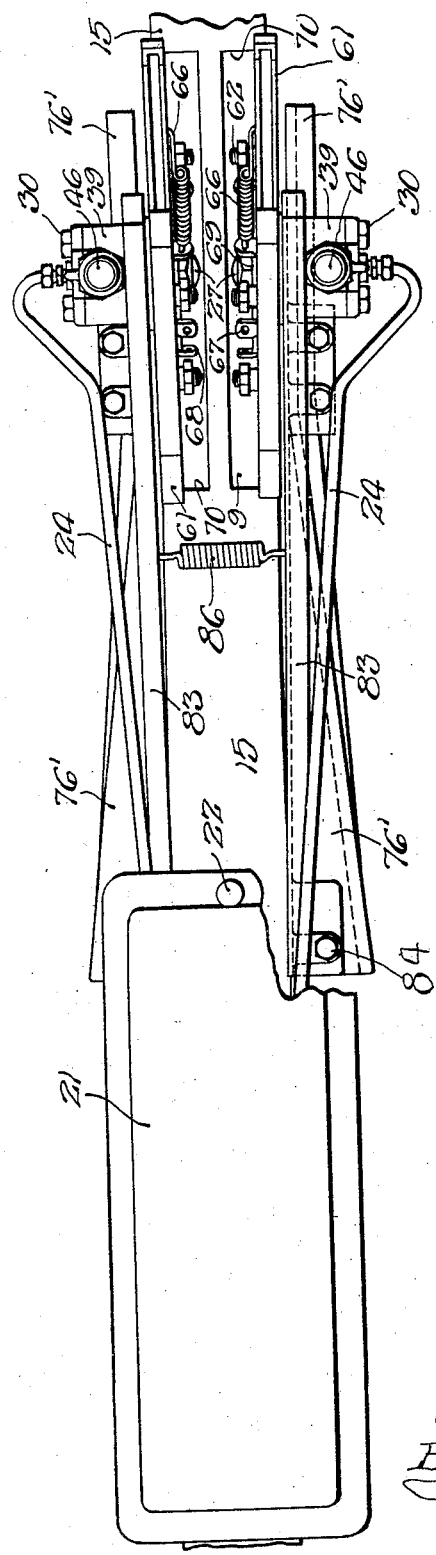
Fig. 7 is a plan view of the structure shown in Fig. 6.

In the modification shown in Figs. 6 and 7, the reservoir 21 is mounted on a stationary frame 16', the latter being secured to the top of the I-beam 8. A supplemental frame 83 is pivotally mounted on the vertical rod 84 on the main frame 16' and the pipe 24 is connected by a flexible union 85 to the bottom of the reservoir 21. The lubricating apparatus shown in Figs. 1 and 2 is mounted at the right-hand of the frames 83, 83 shown in plan in Fig. 7. A spring 86 connects the frames 83, 83 so that they will be urged toward each other on their upright pivots 84.

Secured to the lower sides of the supplemental frames 83, 83 are channels 76', 76' which have a guiding function in that they are so located as to be engaged by the upper outside peripheral edges of the trolley wheels 10, 10 to bring the nozzles 48 into registry with the oil cups 20, 20. The channels 76', 76' are diverging from the left toward the right as viewed in Fig. 7. Therefore when the trolley wheels enter these diverging portions they will be guided thereby to the longitudinal forward straight portions with the assurance that the oil cups 20 will be brought into direct registry with the nozzles 48 at the proper time. As shown in Fig. 6, the nozzle 48 extends through an opening 82' in the channel 76' in the same manner that the nozzle 48 extends into the opening 82 in the channel 76 as shown in Fig. 2.

Obviously those skilled in the art may make various changes in the details and arrangement of parts without departing from the spirit and scope of the invention as defined by the claims hereto appended, and I wish therefore not to be restricted to the precise construction herein disclosed.

Having thus fully disclosed an embodiment of my invention, what I desire to secure by Letters Patent of the United States is:

1. In automatic lubricating mechanism, the combination with a lubricator, of means for operating the same, a pivoted lever in the path of the moving part to be lubricated and connected to said operating means to serve as an actuator therefor, and a retaining spring connected to said lever to permit swing thereof on its pivot when said moving part is reversed.

2. In automatic lubricating mechanism, the combination with a lubricator, of means comprising a cam for operating the same, a support movable with said cam, a lever pivoted to said support, an abutment for limiting the movement of said lever in one direction, a spring for yieldingly holding said lever against said abutment, and means for mounting the lubricator with the said lever in the path of the part to be lubricated.

3. In an automatic lubricating apparatus, the combination with a lubricator, of means for operating the same, and a plurality of actuators connected to said operating means and arranged to come successively into the path of traveling parts to be lubricated, said actuator being shiftable by the movement of the parts to be lubricated and being mounted to drive the lubricator when moved in one direction but yielding with respect to the lubricator when moved in the opposite direction.

4. In automatic lubricating apparatus, the combination with a lubricator, of means for operating the same, a plurality of pivoted levers, abutments one for each of said levers, springs for holding said levers against said abutments, and means connecting said abutments and levers to said operating means.

5. In lubricating apparatus, the combination with a lubricator having a nozzle, of a main support, a track on said support, a traveling member to be lubricated while moving along said track, a supplemental support pivoted to said main support in position to guide said traveling member into registry with said nozzle, a spring urging said supplemental support toward the upright plane of said track, and means actuated by said traveling member for operating said lubricator to lubricate said member when said nozzle registers therewith.

6. In an automatic lubricating apparatus, the combination with an I-beam, of a lubricant reservoir mounted thereon, trolley wheels movable along the lower track flanges of said I-beam, lubricating cups for the bearings of said trolley wheels, guide frames pivotally mounted on said I-beam, lubricators one on each of said guide frames and each having a nozzle connected to said reservoir, means actuated by said wheels for operating said lubricators when said nozzle registers with said lubricating cups, and a spring for pulling said guide frames toward each other to place said nozzles in registry with said lubricating cups.

7. In automatic lubricating apparatus the combination with a stationary support, of a lubricator mounted thereon and comprising a stationary nozzle, a stationary track, a trolley wheel traveling along said track, a lubricant cup for the bearing of said wheel, a pivoted guide in position to be engaged by said wheel to hold said cup in registry with said nozzle, a spring acting on said guide to urge the same into position to be engaged by said wheel, and mechanism actuated by said wheel to operate said lubricator to discharge lubricant from said nozzle into said cup when in registry therewith.

8. In automatic lubricating apparatus, the combination with a stationary support, of a lubricator mounted thereon and having a discharge nozzle, an arcuate pivoted guide, a track, a trolley wheel movable along said track, a lubricant cup for the bearing of said trolley wheel, a spring acting on said guide to urge the same toward the path of said wheel, and mechanism actuated by said wheel for operating said lubricator to discharge lubricant from said nozzle to said cup after said guide has brought the latter into registry with said nozzle.

9. In automatic lubricating apparatus, the combination with a support, of a pair of lubricators mounted thereon, a pair of trolley wheels, a double track for said wheels, a pair of pivoted arcuate guide frames, springs for urging said guide frames into the paths of said wheels respectively, lubricant receiving cups for the bearings of said wheels, and mechanisms actuated by said wheels for operating said lubricators to discharge lubricant from said nozzles into said cups when the nozzles are in registry therewith.

10. In lubricating apparatus, the combination with a nozzle, of reciprocating mechanism for intermittently discharging lubricant from said nozzle, rotary means for operating said reciprocating mechanism, and mechanism in position to be actuated by a traveling member for intermittently rotating the rotary means.

11. In automatic lubricating apparatus, the combination with an I-beam, of a stationary frame mounted thereon, a reservoir mounted on said frame, a pair of trolley wheels movable along the lower track flanges of said I-beam, a pair of supplemental frames pivoted to said stationary frame and comprising guides adapted to be engaged by said wheels, lubricators one on each of said supplemental frames and each comprising a discharge nozzle, lubricant cups for the bearings of said wheels in position to register with said discharge nozzles, means actuated by said wheels for operating said lubricators to discharge lubricant from said nozzles when the latter register with said cups, and a spring for pulling said supplemental frames toward each other to hold said guides against said wheels and thereby bring said nozzles in registry with said cups.

12. In an automatic lubricating apparatus, the combination with a moving part to be lubricated, of a lubricator and means to guide the part in a pre-determined path adjacent the lubricator, said lubricator having a discharge adapted to feed a lubricant to the part as the same passes the lubricator, rotatable means for actuating the lubricator, said rotatable means having an arm disposed in the path of the part to be lubricated and arranged to be shifted by the part in passing the same to impart lubricator actuating movement in the rotatable means, said arm being yieldable when engaged by the part travelling in the other direction to permit the part to pass without imparting lubricator actuating movement in the rotatable means.

In testimony whereof I have signed my name to this specification on this 5th day of August, A. D. 1929.

JOSEPH R. WARNER.